Figure 1:
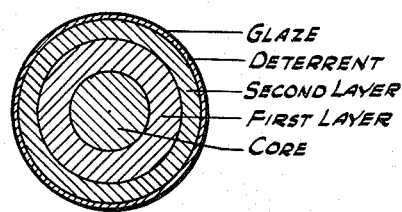

July 13, 1965

C. W. SAUER ET AL 3,194,851

PROCESS FOR FORMING PROPELLANT GRAINS
HAVING A COMPOSITE STRUCTURE

Original Filed June 20, 1955

3 Sheets-Sheet 1

INVENTORS.
CHARLES W. SAUER
EKKEHARD L. KREIDL
BESSIE A. LEPPER
BRUCE S. OLD

BY

AGENT

July 13, 1965     C. W. SAUER ET AL     3,194,851
PROCESS FOR FORMING PROPELLANT GRAINS
HAVING A COMPOSITE STRUCTURE
Original Filed June 20, 1955     3 Sheets-Sheet 3

INVENTORS
CHARLES W. SAUER
EKKEHARD L. KREIDL
BESSIE A. LEPPER
BRUCE S. OLD.
BY
AGENT 3,194,851
PROCESS FOR FORMING PROPELLANT GRAINS HAVING A COMPOSITE STRUCTURE
Charles W. Sauer, Cambridge, Ekkehard L. Kreidl, Wayland, Bessie A. Lepper, Cambridge, and Bruce S. Old, Concord, Mass., assignors to the United States of America as represented by the Secretary of the Army
Original application June 20, 1955, Ser. No. 516,374. Divided and this application Jan. 21, 1963, Ser. No. 254,854
3 Claims. (Cl. 264—3)

This application is a divisional of an earlier application (now abandoned) Serial No. 516,374 filed June 20, 1955.

This invention relates to the manufacture of propellants and more particularly to the manufacture and composition of multilayer propellants containing a core which has burning characteristics different from the burning characteristics of the surrounding layers. Although the propellants of this invention are particularly suitable for small arms ammunition, their application is not limited to that use.

The use of modern weapons requires propellants the ballistic properties of which must be capable of careful and precise control. Conventional deterrents do not permit such control in all cases. Furthermore, many deterrents are not capable of burning by themselves in the absence of external oxygen. Their use normally results in a composition gradient in the propellant which in itself is not objectionable, but such composition gradients tend to intermigrate, giving the propellant ballistic properties which vary with time after their manufacture. In contrast to this, the propellants of this invention provide grains having discrete layers with sharply defined boundaries, each layer of which is capable of burning as a propellant, thus permitting greater control over the burning characteristics by eliminating the variation in composition gradients usually found in propellants where the components can intermigrate. Each layer of the propellants of this invention burns over a substantial part of the total burning time of the propellant, for example at least 15 to 20 percent of such total burning time.

As an example of the type of performance obtainable from the propellants of this invention, their application to small arms may be mentioned. Porpellants to be used in small arms ammunition should possess burning characteristics which give a rapid pressure rise to the maximum allowable and then such maximum pressure for a brief period of bullet travel. This is, as a rule, obtained by having so-called progressively burning propellants, that is propellants whose mass burning rate increases during the burning time. Conventional small arms propellants achieve progressivity by means of the so-called deterrent coating which slows down the burning process in its very early stages, by propellant geometry, and by the fact that the burning rate as a rule increases as the chamber pressure in the gun rises. It has also been suggested that improved interior ballistics as well as decreased barrel erosion, due to the action of the hot propellant gases, might be obtained if the propellant composition during the earlier parts of the burning process would have a lower flame temperature and impetus that that in the last phases, where the intrinsically hotter prollant gases will be cooled rapidly by the expansion caused by the incipient bullet travel. This is apparently in part achieved by some of the deterred nitroglycerin-containing ball powders, which have a relatively cool outer zone gradually changing into a hot inner zone.

Although the propellants prepared in accordance with this invention are particularly suited to small arms use, they may be used in such applications as rockets, cannon powders, etc. The use of multiple layers in the propellants of this invention permits varying burning rates as well as flame temperatures from layer to layer. Thus propellants may be made, in accordance with this invention, which may have layers exhibiting for example, low flame temperatures and high burning rates, or high flame temperatures and low burning rates, combinations which have not been readily available in propellants made heretofore. Of course, the layers may also have high flame temperatures accompanyied by high burning rates or low flame temperatures accompanied by low burning rates.

Once the principles of the present invention are understand are understood it becomes apparent that the proper utilization of such propellants with two or more discrete layers permits the design of a variety of propellants of improved and unusual properties. Thus it becomes possible to prepare propellants of any desired degree of progressivity regardless of propellant geometry by choosing for the successive discrete layers propellant compositions of different burning rates. Thus the outer layer, usually a slower-burning increment, could be a nitrocellulose (11 percent nitrogen), the second layer a typical nitrocellulose (13.2% nitrogen) composition, and the central layer a nitrocellulose composition whose burning rate is increased by the inclusion of a burning additive such as potassium dinitroacetonitrile. In other cases it may be desirable to design propellants capable of burning throughout the bullet travel, that is throughout the barrel length without giving rise to undesirable flash. In such a case it may then be preferable to have the central discrete layer, which would be controlled to start burning after about one to three calibers bullet travel, consist of a cool propellant such as a nitroguanidine composition. In the case of a spherical or similar shaped propellant it would be also feasible to have such a central discrete layer consist of hydrazine nitrate or other water-soluble substance, since it could be protected from the surrounding atmosphere by a water-resistant material. The possibility of barrel erosion may make it desirable to have the outer discrete layer formed from a cool burning propellant, such as nitrocellulose (11 percent nitrogen), nitroguanidine compositions, etc. Propellants or high energy materials of high flame temperature may then be used to form one or more inside layers.

The present invention, as discussed in more detail below, is, however, not limited to any particular arrangement, but refers broadly to the concept of propellants having a multiplicity of discrete layers, which layers may provide distinctly different performance characteristics during the successive stages of burning and may have distinctly different physical and chemical properties. This invention also comprises a variety of methods and processes for preparing the propellants disclosed herein.

The use of spherical propellant grains formed from nitrocellulose and nitroglycerin mixtures for small arms ammunition is known in the art. Such spherical grain propellants or ball powders are described, for example, in U.S. Patents 2,027,114, 2,160,626, 2,213,255 and 2,375,175. Spherical or nearly spherical grains have the advantage of being free flowing and of being capable of achieving good packing or loading densities. Some of the propellants previously made in spherical shapes and containing nitroglycerin have composition gradients which tend to intermigrate over long periods of time.

It is an object of this invention to make a propellant with controlled burning rates at various stages in its burning. It is another object to produce a propellant with controlled flame temperature at various stages in its burning, for example, cool burning in the earlier stage or cool burning during bullet travel beyond two or three calibers. It is a further object to make a propellant of controlled grain size, shape, composition and burning characteristics. It is yet another object of this invention to make a propellant which is physically and ballistically stable over long periods of storage and free from exudation or intermigration of the components. It is another object to make a propellant with high loading densities. It is also an object to manufacture propellants suitable for small arms ammunition in an easy and safe manner. These and other objects will become apparent in the following discussion.

In accordance with the present invention, the general method used is to surround one or more crystals, discrete particles, small granules, cylinder rods or other controlled geometrical shapes of a core material with one or more discrete layers of material. The core is usually solid or plastic but does not have to be. The materials used for cores and outside layers do not each have to be of different chemical composition, but may be the same material in different physical forms or possessing different burning characteristics. The multi-layer propellant grain thus formed may be further coated with a suitable burning modifier, such as a deterrent, and finally be glazed as is done with conventional propellants. For the sake of clarity, the grains will be referred to as being made up of a core and outside layers.

Figure 2:
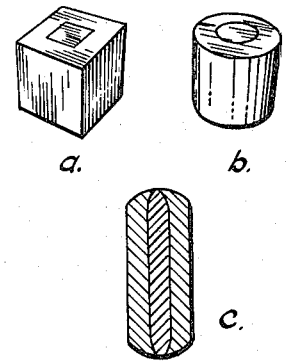
Figure 3:
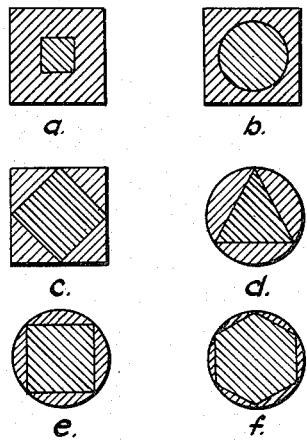
Figure 4:
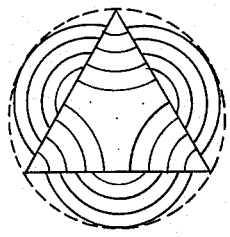

The methods for preparing the propellants of this invention can be conveniently classified into two groups: coating cores (crystals, agglomerates and other geometric shapes) by liquid immersion including shock gelation, tumbling, etc., and by coating strands by multiple extrusion. Each of these methods may be carried out by several different processes. For the sake of clarity in presentation, each method with its various modifications will be discussed in the order indicated, and in connection with the accompanying drawings, wherein FIGS. 1 through 3 represent typical grain shapes and configurations of the propellants of this invention, FIG. 4 represents a typical burning pattern, and FIGS. 5 through 10 are schematic representations of equipment suitable for carrying out the various aspects of the processes described herein.

Use of the liquid immersion method results in the formation of rounded grains. Such rounded grains may be made by one of three processes referred to hereinafter as the slurry, lacquer and shock-gelation processes.

In the slurry process, the material which is to form the outside layer is mixed into a liquid vehicle called the non-solvent medium, which is a non-solvent for both the outside layer material and the core material. In most cases, water is a satisfactory non-solvent medium. This liquid mixture, if acidic, is brought to neutral with a suitable neutralizer, such as calcium carbonate, and the mixture is then stirred at room temperature or preferably at a somewhat elevated temperature. After the first period of stirring, the core material is added and the resulting mixture is stirred again. A suitable stabilizer for the outside layer material, such as diphenylamine or 2-nitrodiphenylamine in the case of nitrate esters, is dissolved in the solvent to be used to form a lacquer with the outside layer material and the stabilizer-solvent mixture is added to the mixture containing the outside layer material, core material, and non-solvent medium. The resulting dispersion of the outside layer solvent lacquer in the non-solvent medium is stirred vigorously and then if desired, it is permitted to settle into two layers. A protective colloid, such as gum arabic, may be added to the phase containing the non-solvent medium. After the dispersion has settled and concentrated, it is stirred vigorously to break up the lacquer. After vigorous stirring the mixture is stirred at a more moderate rate at an elevated temperature which leads to the formation of the rounded grains. In the process of the grain formation, it is quite possible that some of the non-solvent medium will become entrapped in the coating formed on the grains. It is necessary to remove this entrapped non-solvent medium and this may be done by the addition of an agent similar in function to that of a dializing agent. Thus, in the case of water as the non-solvent medium, sodium sulfate may be added to remove the entrapped water.

Finally, the solvent used in forming the lacquer is removed by heating the system. It has been found that it is desirable to keep the temperature during this heating period a little below the boiling point of the solvent until some 80 percent of the solvent is removed. Then it is feasible to raise the temperature above the boiling point of the solvent. After cooling, the rounded propellant grains are filtered from the non-solvent medium, washed and dried. The grains may be further coated or surface treated as desired.

The second process used in the liquid immersion technique is called the lacquer method. In this process, the outside layer material is first gelled with just sufficient solvent to make a fairly stiff gel and after being mixed well the core material is added and further mixing done. The non solvent medium is added to the core containing gel and the mixture, if acidic, is neutralized and further stirred at an elevated temperature. An additional amount of the solvent containing the stabilizer for the outside layer material is added to the foregoing mixture. The resulting mixture is then stirred at an elevated temperature and after stirring, the mixture is permitted to settle into two layers as in the slurry process. As in the case of the slurry process, the settling step may be omitted. This lacquer process is then completed in the same manner as the slurry process.

The size of the final grains can be controlled by the size of the cores used, by the ratio of outside layer material to core material, and/or by controlling the size of the globules or lacquer. The size of the globules of lacquer may in turn be controlled by several factors. One of these is the rapidity of stirring the suspension containing the lacquer and the turbulence achieved, the more rapid the stirring the smaller the globules. Another factor is the amount of protective colloid used, the more the colloid the finer the globules. The use of more solvent for the outside layer material, i.e., the use of thinner lacquers decreases the size of the globules. Increasing the temperature during the sphere formation step will also decrease the size of the globules.

The third process applicable to the liquid immersion method has been designated herein as the shock-gelation method. Shock-gelation in itself is not new. For example, it has been applied to the manufacture of propellant ball-type or rounded grains containing a single composition. According to our invention, discrete layer propellants are made by gelling the outside layer material with a liquid solvent, and the granules, crystals or discrete particles forming the core material are uniformly dispersed into the gel formed. By means of a suitable mechanical device, the gel is dropped, forced or fed through an opening to form globules. The size of the opening is adjusted to permit only one crystal or particle of core material coated with the desired quantity of outside layer material in the gel. It is also possible to gel one drop inside another simultaneously if the inside and outside drop materials are of different compositions.

The globules containing cores or inner drops, are dropped into a liquid medium which is miscible with the solvent but immiscible with the outside layer material or core material. The distance through which the globules are dropped depends upon the viscosity of the solution and such distance must be great enough so that a spherical or rounded drop has been formed when it hits the surface of the liquid medium. If spherical propellant grains are desired the drop distance may be so adjusted to prevent flattening the sphere thus formed upon the impact with the liquid surface. On the other hand, if flattened grains are desired, the drop distance may be so adjusted as to produce them. As soon as the droplet hits the liquid medium diffusion takes place so that a portion of the solvent in the outside layer diffuses outward and some of the liquid medium diffuses inward. By using the proper conditions and the proper solvent, a layer or membrane is formed on the surface through which normal diffusion of the solvent and liquid medium takes place to set up an equilibrium of solvent on the outside and inside. Throughout this diffusion process the rounded grain containing the core material remains approximately the same size and shape as when it entered the liquid medium. (If flattened slightly, it may slowly recover sphere shape in this stage.) The droplets at the end of the diffusion process are saturated with the liquid medium instead of the original solvent which had been used to form the gel with the outside layer material. The rounded grains are then filtered from the liquid medium and dried. In drying, the outside layer shrinks evenly around the core to form a hard continuous coating and a grain with well defined layers.

The rounded grains formed by any of the three processes applicable to the liquid immersion method are illustrated in cross-section in FIG. 1 where an ideal spherical grain is depicted. The number of layers surrounding the core need not be limited to one, but may be one or more discrete layers, each of which possesses distinct burning characteristics. The rounded grains may be finally coated with a deterrent such as dinitrotoluene or dibutyl phthalate and then glazed with graphite or other suitable glazing agent.

Progrossivity, i.e., the increases in burning rate, is achieved solely by burning through consecutive layers of these grains. By arranging the layers and core so that the burning rates increases as burning proceeds toward the center, the burning can be adjusted to become highly progressive in spite of the inherent regressive geometry, resulting in the type of propellant performance described earlier as being desired for small arms propellant, for example.

In addition to the three techniques (slurry, lacquer and shock-gelation) herein classified as coming under the so-called liquid immersion method for coating discrete cores of geometric shapes, one other general technique is available for doing this. This technique embodies the coating of geometric cores wihtout the use of any large quantity of liquid media. Thus, they may be tumbled in a sweetie barrel, or in similar equipment, in the material which is to form the outside layer, or the grains may be mixed into a viscous solution of the outside layer material made up with a solvent which is readily removable after the desired degree of coating has been attained. Such cores may easily be made by extruding strands with the desired geometric cross-sections and cutting the strands to the desired core lengths. Alternatively, the cores may be made by pelletting or by other suitable forming methods.

The second general method for the preparation of the discrete layer propellant has been designated herein as the multiple extrusion method. While extrusion methods for coating wire are known, the problem of preparing discrete multiple layer propellants is different and has necessitated the development of modified extrusion methods which form an important part of this invention. Conventional extrusion coating deals, in general, with core materials of high intrinsic strength with little plastic flow such as metal wires which are usually coated with such plastic materials as polyvinyl chlorides, rubber, or lead. In the preparation of the propellants by the extrusion method according to this invention the materials used for forming the several discrete layers, including the central core, vary less in physical properties than in the more common case where wire core is coated with plastic coating.

A number of fundamentally novel extrusion methods capable of producing discrete multi-layer propellants, according to this invention, are presented below. These are illustrated schematically in FIGS. 5 through 10 each of which shows a modified extrusion method.

Figure 5:
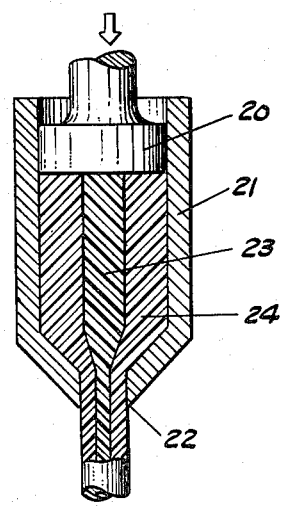

The first of such extrusion methods, shown in FIG. 5, is based on the discovery that viscous or plastic materials can be co-extruded by a batch process, using a single extrusion piston, or ram, 20 in an extrusion cylinder 21 with an extrusion die 22 similar to conventional propellant batch extrusion equipment. In this modification two or more discrete layer materials, including the core material, are preformed to form a blank assembly as in FIG. 5 which shows the core blank 23 and outside layer blank 24. These blanks are arranged according to the desired sequence of layers, the relative thickness of these layers being so adjusted that the entire blank assembly will fill the entire cavity of the cylinder of the extrusion press. Thus, for example, if it is desired to make a two layer propellant in an extrusion press of 3″ diameter and to have a final propellant web of .030″, a blank assembly will be prepared by first pressing, pelletting or otherwise forming a cylindrical slug for a core and a hollow cylindrical slug of 3″ O.D. which will fit rather loosely around the solid core slug. This blank assembly is then inserted into the extrusion cylinder and extruded in the conventional manner. In order to overcome possible difficulties arising from slight asymmetries in the assembly blanks and from different rheological properties of the later materials used, and at the same time to obtain well-centered propellant grains of reliable relative layer thicknesses, it has been found preferable to preshape the blank assembly. This means that the end to be inserted towards the die portion of the press is preshaped to fit into a convergent portion of the cylinder adjacent to the die as schematically shown in FIG. 5. The final web and core thicknesses will be determined by the ratios of the original preforms, as well as by the relative compression and deformation achieved in the nozzle of the extruder. The thicknesses of the original preforms can best be determined by experimentation since their relative rheological properties mean that the ratio of the relative thicknesses desired in the final grain will not be the same as the relative ratios of the original preforms.

While the angle of convergence of the conical part of the extrusion cylinder 21 as shown in FIG. 5 is important in obtaining discrete, multilayer propellants of exact concentricity, it is not possible to provide any simple engineering design rules, since the properties of the materials which may be used in preparing such grains extend over a fairly broad range which cannot be readily expressed in simple equation form. However, once the above principles are understood it is only a matter of simple trial and error experimentation to determine suitable conditions for any given combination of materials. Generally speaking, it will be preferable to have a fairly acute angle between the extrusion cylinder axis and the tapering wall section. In a similar manner it may be preferable also to shape the end of the extrusion piston (ram) facing the material to be extruded to conform generally to the tapering section, forming a less acute angle or even being rounded in its axial portion.

Figure 6:
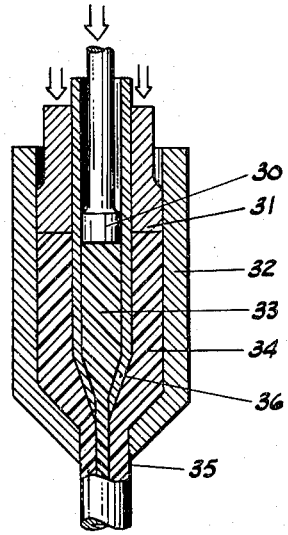

FIG. 6 illustrates a modification wherein the piston in extrusion cylinder 32 is split into two separately acting pistons 30 and 31, separated by dividing cylinder 36, which enable them to exert different pressures on the core material 33 and outside layer material 34. Thus, it is possible at the point of die 35 to obtain equal extrusion velocities of materials of different rheological properties, or to impart different velocities to compensate for vastly different rheological properties. The resulting extruded strands need not necessarily be of circular cross-section, but may be any desirable geometrical shape such as rectangular, oval, triangular or symmetric or asymmetric polygonal. It is also possible, and may be desirable, to have cross-sections of the various layers of different geometries to obtain unusual burning characteristics. Thus, if one or more of the central layers has a polygonal cross-section (triangle, rectangle, square etc.) and the outer layer or layers have circular, oval or otherwise rounded cross-sections, geometric progressivity may be obtained. Such progressivity is achieved because the edges of the cores will be unprotected or covered by a less thick outside layer material which permits burning to progress from the narrow edge in widening circles cross-sectionally toward the center. Obviously, the same effect can be obtained by surrounding a circular or other rounded cross-sectional center with a polygonal outer layer structure.

A second modification of multiple extrusion for forming the propellants of this invention is based on the discovery that by suitable adjustment of extrusion speeds, it is possible to co-extrude or coat-extrude discrete multiple layer propellants by either piston or screw extrusion techniques without the use of assembly blanks as described above. These methods of extrusion require minimizing the differential speeds between the propellant materials as they emerge from the die.

Figure 7:
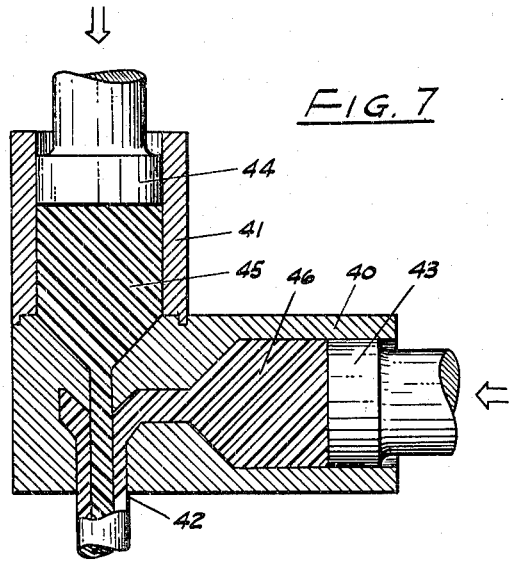
Figure 8:
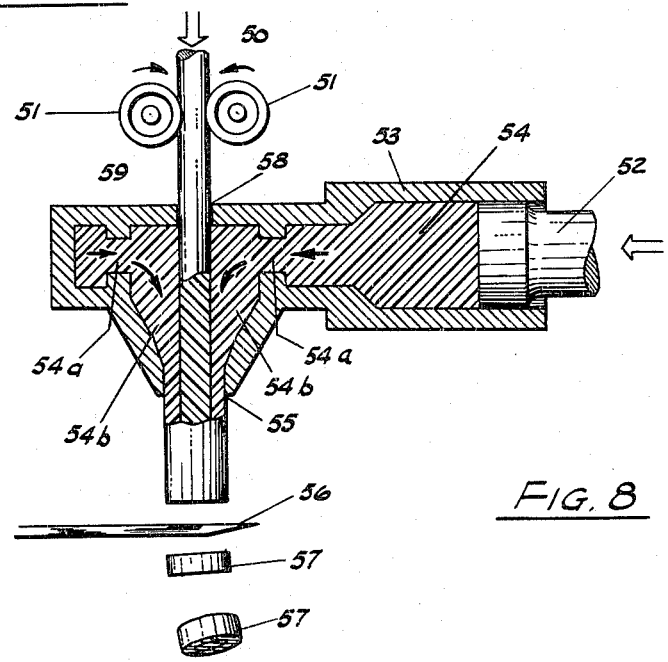

FIGS. 7 and 8 show two possible schematic representations of such multiple extrusion devices. FIG. 7 illustrates a double ram extruder with independent rams while FIG. 8 shows the use of a preformed core and an auxiliary ram extruder which extrudes a coating about the preformed core. In either case, screw extruders may be substituted for the ram extruders, thus permitting a continuous process. In each of these double extrusion modifications it is necessary to achieve careful control of the co-operating extruders.

We have found that when materials suitable for the propellants of this invention (that is materials sometimes having little tensile strength) are extruded simultaneously from a horizontal cylinder 40 (FIG. 7) and a vertical cylinder 41, the speeds at which the layers emerge from the double die 42 should be as nearly as possible equal. In order to achieve equal emergence speeds the relative speeds of the horizontal piston 43 and vertical piston 44 must be carefully adjusted to allow for the difference in compressibility and rheological characteristics of the core material 45 and the outside layer material 46. Even if the materials have similar physical properties some differential adjustment may be necessary to compensate for the difference in degree of compression obtainable in the various dies used. While it is not possible to predetermine the differential adjustment by calculation, given the properties of the materials and the design parameters, once the principles of double extrusion are understood, the adjustments can be made by simple experimentation. Thus, short pre-runs may be made separately with each extruder section and the driving force adjusted until the desired velocity of the emerging propellant strand is obtained. In the case of ram extruders, which are usually pressure controlled, the speeds of the sections can be maintained by having a feedback from one section to the other to increase or decrease the ram pressures in order to continuously adjust the speed regardless of possible fluctuations in the materials flow.

In making the propellants of this invention it has been found that it is possible to extrude an outer layer around a preformed core of one or more layers as shown in FIG. 8. In FIG. 8 the preformed core strand 50 is fed by guide rollers 51 through an aperture 58 in the vertical portion 59 of the extrusion apparatus. The ram 52 in the horizontal cylinder 53 exerts pressure on the outside layer material 54 to force it through the narrow restrictions 54a into the area 54b which surrounds the core strand 50. The coated strand is extruded through die 55 and as it emerges is cut by blade 56 of a rotary cutter into grain lengths 57.

As in the previously described double extrusion method, it is necessary to adjust the speeds at which the coating material is extruded and at which the core is moved to minimize or eliminate any differentials in these two speeds. This adjustment is preferably achieved by adjusting the extrusion pressure and speed of the coating material in the nozzle so the extrusion of the coating readily carries along the core (of one or more materials) without pushing or pulling the core as is usually done in conventional wire coating or large rocket grain coating.

The third method of multiple extrusion takes advantage of a known modification of the shock gelation method described above. In this known method a gel is forced through a plate with perforations or simple nozzles and shock gelled in a bath as it emerges in the form of a strand. After shock gelling (leaching) the strand may be cut into grain lengths either before or after drying.

Figure 9:
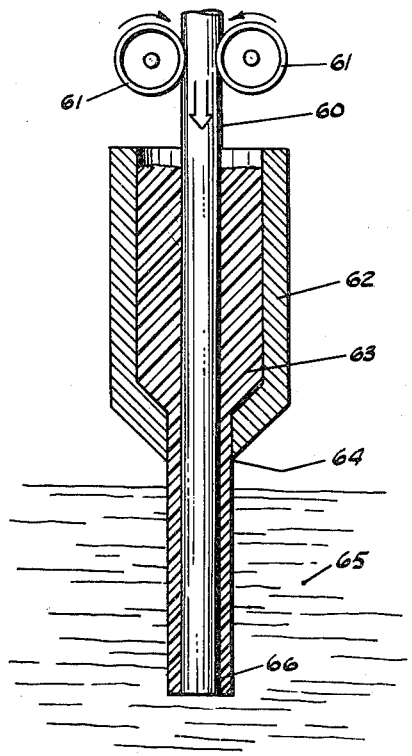

It has been found that propellants according to this invention can be made by a scheme such as illustrated in FIG. 9. With reference to FIG. 9, the central core 60 is fed through guide rollers 61 into a cylinder 62 containing the gel bath 63. By the time the core strand 60 passes the point of the die 64 it has been coated by the gel bath. From die 64 the coated core strand is introduced into the liquid medium 65 where the gel solvent is leached out and replaced by the liquid medium to form the strand of multi-layered propellant 66. The core strand should preferably be pliable and straight for easy feeding through the guide rollers and the rate at which it is fed should be synchronized with the gel extrusion speed (a function of its viscosity) to form an outer discrete layer around the core strand. The speed at which the strand is fed through, the viscosity of the gel bath and the size of the die will all go to determining the final web size of the grains. The strand may be cut before or after drying. It could be cut while in the liquid medium, but the grains would probably have "pinched" ends.

Figure 10:
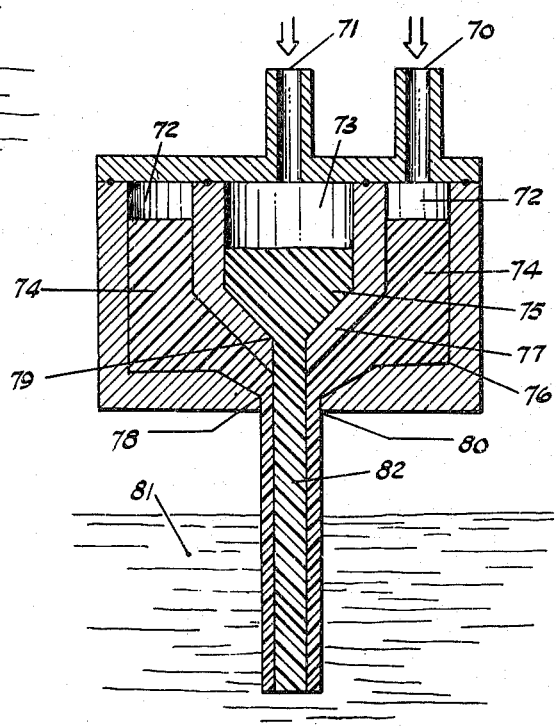

Another modification of the combined double-extrusion shock gel method is illustrated in FIG. 10 in which pressurizing fluids are introduced by way of inlets 70 and 71 into areas 72 and 73 above the gel baths 74 and 75 which are to form the outside layer and core, respectively. The gel baths are contained in cylinders 76 (outside layer material) and 77 (core material). Restrictions 78 and 79 in these cylinders 76 and 77, respectively, determine the extent of gel bath flow into die 80. The resulting concentric core and outside layer strands are united into one propellant strand 82 which is conducted into liquid medium 81 for leaching (shock gelation). As in the case of the other strands made by shock gelation, the strand thus formed may be cut while in the liquid medium, or after it is removed from the liquid medium, before or after drying. Also as in the case of the other methods of double extrusion, this method requires a careful control of the rates at which the strands are forced through and merge at the point of the die. These rates are best determined experimentally for each set of materials used.

Still another modification of double extrusion consists of passing a solid core strand, formed to its final dimension, through a liquid bath of coating material and out through a properly sized nozzle-type outlet in order to apply the desired coating of outside layer material. By controlling the size of the nozzle type outlet and the viscosity of the bath it is possible to extrude a multi-layered propellant of the desired final web thickness. The bath is preferably a viscous solution of the outside layer material, made up with a solvent readily vaporized so that as the coated core emerges, the solvent may be quickly removed to give a tightly adhering outside layer around the core. The evaporation of solvent from the outside layer should be rapid enough to permit handling the resulting propellant strands so they may be dried and further processed.

Some of the types of grains which may be produced by the processes described above are illustrated diagrammatically in FIGS. 1 through 4. FIG. 1 illustrates the type of cross-section to be expected from rounded grains made by any of the liquid immersion techniques described. Although the grain illustrated in FIG. 1 is an ideal sphere, it need not be, for the same type of grain may be produced in a flattened form. The three grains sketched in FIG. 2 illustrate the more common types to be made by any of the double extrusion methods or by one of the combinations of double extrusion and shock gelation. The geometric cross-sections are, of course, not limited to the square (FIG. 2(a)) or the circle (FIG. 2(b)). FIG. 2(c) shows the cross-section of a grain such as FIG. 2(b) which was pinched at the end in the cutting process to give a "pillow" type grain.

In FIG. 3 are illustrated a number of possible combinations of geometric cross-sections of cores and outside layers. These grains represented by FIG. 3 (c through f) show how it is possible for the core edges to be exposed to the ignition flame or to be only slightly covered by the outside layer material. Thus, in the case of the triangular core in a circular grain, burning will proceed essentially as illustrated in FIG. 4, permitting the core to burn earlier in the process. This is to be compared with the burning of grains shown in FIG. 2(a) and (b) which have ends which permit the direct exposure of the core material to the initial flame ignition. This means that burning of these grains will proceed downward through the core as well as through the coating, thus resulting in burning characteristics different from those exhibited by the rounded grain shown in FIG. 1 or the "pillow" grain shown in FIG. 2(c). In the grains illustrated in FIG. 3 (c through f) the number of edges which the core possesses will determine the degree of progressivity achieved (assuming the core is of a more rapidly burning material than the outside layer). For example, in the case of the circumscribed prism (FIG. 3(d)) the three edges and the comparatively large amount of outside layer present will show more progressivity than in the case of the hexagonal core (FIG. 3(f)) where there are 6 edges for burning to begin with and more core material to burn rapidly, thus approaching a thinly coated core of the type shown in FIG. 1.

It will be seen from the above discussion and examples that propellant grains can be made which may be controlled as to point and duration of maximum energy release. This is achieved by making a propellant grain containing a core with one or more outside layers, the core and each subsequent layer being insoluble in each other, even after long periods of storage. Since the components of the various layers do not migrate into other layers or into the core, there are few or no composition gradients. In one modification of this invention it is possible to use very high energy materials, as cores, for small arms propellants and at the same time to control the burning of these high impetus core materials. In addition, by employing the different techniques to make the multiple layer propellants of this invention, it is possible to make grains showing differing degrees of progressivity.

As has been pointed out, the propellants of this invention can be made up from a large number of materials having widely varying chemical and physical properties. Even materials which, because of unsatisfactory tensile strength, hygroscopicity, etc., would be normally unsuited to propellants may be used for cores or inner layers provided suitable materials are chosen for outside layers. Choosing propellant compositions therefore requires selecting the components with regard to their compatibility as well as their individual performance such as burning rate, flame temperature, etc. Therefore, every core material is not suitable for use with every outside layer material. Furthermore, a material included below as a suitable core material may conceivably be used as a layer material and some of those listed as suitable layer materials may be used as core materials, particularly if low-temperature cores are desired.

The core material and outside layer materials should not appreciably diffuse into each other even after long storage. Suitable core materials include nitrocellulose (containing from 11.1 to 14.4% nitrogen), explosives such as trinitrotoluene, cyclotrimethylenetrinitramine, cyclotetramethylenetetranitramine, pentaerythritol tetranitrate, ethylenedinitramine, bis(trinitroethyl)nitramine, bis(trinitroethyl)urea and mixtures of these with trinitrotoluene. High explosives mixed with suitable binders and mixtures of nitrocellulose with nitrate esters where no appreciable migration would occur could also be used as core materials.

The material used as the core for the propellants made by the so-called liquid immersion methods should be preferably in small discrete particles, i.e., material which can be added in small granular form or in crystalline form. If the core is an explosive in crystalline form it is preferable that the crystals are as nearly cubical or spherical as possible. The core material should not be appreciably soluble in the liquid non-solvent medium used or in the solvent for the outside layer material. In addition it is preferable for military purposes that the core material should be stable over the range of temperature required in practice, i.e., from $-60°$ F. to $+165°$ F., and should be relatively safe to handle and non-reactive with the outside layer material.

For the double-extrusion techniques the core material should be preferably one which can be extruded in a molten or plastic stage or in a solvent. If the core is originally preformed to final size, as shown by the methods illustrated in FIGS. 8 and 9, then the core material should be sufficiently workable to be pressed, cut, extruded or otherwise made into center cores.

The outer layer or layers are preferably materials which can be worked in a molten or plastic state or which can be formed into an extrudable condition by the addition of a solvent which is fairly readily removed. The outer layer or layers should be materials which are propellants, i.e., materials which are capable of burning in substantially oxygen-free atmospheres. Polymeric or plastic materials such as nitrocellulose, polypentaerythrithylacrylate trinitrate, or poly-2,4,6-triazaheptanol-1 acrylate are all suitable for outside layers. In addition such high-energy materials as TNT, cyclotrimethylenetrinitramine and materials which burn with a low flame temperature such as nitroguanidine, hydrazine nitrate, ammonium nitrate, guanidine nitrate, etc., may be formed into a proper workable state by the addition of binders such as nitrocellulose, polyisobutylene, polyethylene, various polyvinyl ethers, and other polymers previously mentioned. Groups containing nitrogen are particularly desirable since they serve to impart energy to the over-all propellant system and also to furnish quantities of nitrogen gas in the reaction products. The nitrogen formed helps to keep the flame temperature of the propellant within a range which can be tolerated by currently existing weapons. However, if other suitable materials, such as peroxides, can be polymerized, they, too, would be satisfactory for layer materials. The outside layer materials should preferably be compositions which are easily soluble in the more common organic solvents and which do not dissolve the core to an appreciable extent. They should also be stable over a long storage period and for military purposes preferably over a temperature range of $-60°$ to $+165°$ F.

The ballistic properties desired of the propellants of this invention will determine the relative weight ratios of the two principal components, that is the core material and the outside layer material or materials. Normally, the amount of core material will be determined by the duration of rapid, high-impetus burning or other ballistic properties which may be desired. Thus, for example, where cyclotrimethylenetrinitramine and nitrocellulose are used as core and outside layer material, respectively, it is possible to use from about 10 to 50 percent, by grain weight, of core material, while the preferable weight range is from 15 to 35 percent core material.

It may be found desirable to add deterrent layers of such materials as dinitrotoluene, dibutyl phthalate, diamyl phthalate or 2,4-dinitroanisole. These may be used in concentrations ranging from about 1 to 20 percent by weight of the propellant grain to be deterred and can be put on by any of the methods known in the propellant art.

Finally, it may be desirable to glaze the propellant grains made by the process of this invention to make a very free-flowing propellant. Glazing may also be done by any of the glazing processes known to those skilled in the art. A small quantity of graphite applied in a "sweetie barrel" has been found to be a very satisfactory glaze.

The solvents suitable for the liquid immersion methods should be ones which are suitable for making a good lacquer with the outside layer material and should be substantially immiscible with the non-solvent medium used. They should, furthermore, have a boiling point above the temperatures used in the mixing steps, but not so high as to make their removal difficult after the propellant grains are formed. Thus a boiling point within the range between about 70° C. and 90° C. is preferable. Such solvents may include ethyl acetate, isopropyl acetate, methyl isobutyl ketone, or a mixture of methyl ethyl ketone and toluene. The choice of the solvent will, of course, be made with reference to the outside layer material and core material chosen.

The non-solvent medium for the slurry and lacquer processes should be a liquid which is substantially inert to and essentially a non-solvent for both the core material and the polymer lacquer. It should be stable at the elevated temperatures used in the mixing steps and should, for practical purposes, be relatively inexpensive. In most cases, water will be found to be the most satisfactory vehicle.

In the shock gelation method, however, the solvent and liquid medium must be miscible which makes the choice of these two components somewhat different than for the slurry or lacquer methods. In addition to being miscible with each other, the solvent and liquid medium should preferably be nonsolvents for the core material. For example, ethylene glycol may be used as the solvent for the plastic or polymeric outside layer and water for the liquid medium into which the globules are dropped and the rounded grains form.

An excess of solvent is to be avoided to minimize the amount which must finally be removed and also to minimize the possibility of pore formation in the outside layers. A minimum amount of solvent is also desirable from an economic and a safety point of view. The amount of the non-solvent medium in the slurry and lacquer process and of the liquid medium in the shock gelation methods is not critical but should be sufficient to insure a safe operation but not so great as to introduce handling difficulties. The order of the quantities of the remaining components will be illustrated in the examples given.

The choice of the stabilizer depends upon the choice of the outside layer material or materials used to coat the core. For example, in the case of nitrocellulose, a small quantity of diphenylamine or 2-nitrodiphenylamine has been found to be a satisfactory stablizer.

The protective colloid is added in the liquid immersion methods to facilitate the formation of uniform grains and to prevent their adhering to each other. Typical colloids include such compounds as gum arabic, gelatin, gum tragacanth, dextrin, starch, animal glue, or bentonite.

The agent used to remove the non-solvent medium entraped in the grains in the slurry and lacquer processes should be one which is inert or nonreactive with the components of the mixture. If water is used as the nonsolvent medium such agent may conveniently be an inorganic salt such as sodium sulfate, sodium chloride, barium nitrate or potassium nitrate.

The temperatures used throughout the processes are generally somewhat greater than room temperature to aid such processes as lacquer formation, mixing, and grain formation, to control the size of grains, and to drive off the solvent. Solvents should not be removed so rapidly as to cause pores to form. This may be regulated by proper temperature control.

Stirring where required should preferably be continued only as long as to accomplish the purpose of the step. Moderate stirring speeds are generally preferred, but the final determination of stirring speed should be with regard to turbulence and fluid shear involved.

The following examples illustrate the propellant of this invention and the various processes for making them. The scope of this invention is, however, not limited to these examples.

*Example I*

In a three liter Morton type flask, equiped with a propeller-type stirrer, sixty grams of nitrocellulose (13.2% nitrogen) was introduced with 1315 cc. of distilled water containing one gram of calcium carbonate. The slurry thus formed was stirred at a moderate rate for about one hour beginning at room temperature and gradually increased to 50° C. During the initial 15 minutes of stirring 15 grams of cyclotrimethylenetrinitramine (RDX) crystals ranging from 0.012 inch to 0.028 inch in diameter was added and thoroughly incorporated in the slurry. Some 295 cc. of an 80/20 mixture of methyl ethyl ketone and toluene, containing 0.6 gram of diphenylamine, was slowly added to the nitrocellulose-RDX-water dispersion with moderate stirring. The temperature was gradually raised to 65° C. and stirring was continued for about an hour. Just as the stirring was stopped, 120 cc. of a 10% aqueous solution of gum arabic was added The mixture was then allowed to stand for 30 minutes and separate into two layers, the aqueous layer on the bottom, the nitrocellulose lacquer layer on the top. The lacquer was then stirred rapidly for three to four minutes to break it up. The stirring speed was reduced to about 760 r.p.m. and the temperature increased to 75° C. Stirring was continued for about two to three hours during which time spheres were formed. The temperature was then lowered to about 70° C. and 75 grams of powdered anhydrous sodium sulfate was added and thoroughly mixed in. The dewatering period was then carried on for four to five hours at 75° C., i.e., below the boiling point of the methyl ethyl ketone-toluene mixture. The temperature was then increased to just below the boiling point of the solvent mixture and after some 80% of it had been removed by distillation, the temperature was raised to 94° C. to insure complete removal of the solvent. The resulting product was cooled to 40° C. and the spherical grains were washed, filtered, rewashed and dried. These grains ranged in size from 0.013 to 0.033 inch, with the larger percent ranging from 0.020 to 0.024 inch in diameter.

*Example II*

In a wide mouthed flask, 20 grams of pyro-nitrocellulose (12.61% nitrogen) and 40 grams of hygrade-nitrocellulose (13.5% nitrogen) were mixed, soaked with enough of an 80/20 methyl ethyl ketone-toluene mixture to form a stiff gel, and then permitted to stand for about 18 hours. The nitrocellulose gel was kneaded for 30 minutes in a small sigma-blade mixer and then 15 grams of RDX crystals of the same size range as used in Example I was added slowly as the kneading continued for about 10 minutes more. A small amount of distilled water was worked into the gel to make it flowable and the resulting mass was placed in a 3-liter Morton type flask containing about 1300 cc. water and 0.6 gram calcium carbonate. The mixture was stirred for about one hour while the temperature was gradually increased to 50° C. Some 275 cc. of an 80/20 methyl ethyl ketone-toluene mixture, containing 0.86 gram dinitrotoluene and 0.6 gram diphenylamine, was added slowly to the dispersion and the temperature was gradually raised to 60° C. and maintained thus for about 20 minutes and then was further raised to 65° C. Stirring was continued for about an hour. Just as the stirring was stopped, 120 cc. of a 10% aqueous solution of gum arabic was added. The mixture was then allowed to stand for 30 minutes and separate into two layers, the aqueous layer on the bottom, the nitrocellulose lacquer on the top. The lacquer was then stirred rapidly for three to four minutes to break it up. The stirring speed was reduced to about 760 r.p.m. and the temperature increased to 75° C. Stirring was continued for about five hours during which time globules were formed. During the initial 20 minutes of reduced stirring speed 75 grams of anhydrous sodium sulfate was added. After the spheres were formed, distillation of the solvent at about 77° C. was begun. After 80% or more of the solvent had been so removed the distillation temperature was raised to 94° C. to remove all the remaining solvent. The propellant grains were cooled, washed and dried at 60° C. The greater part of the grains ranged in size from 0.020 to 0.024 inch in diameter and were well formed and smoothly coated.

An additional deterrent coating of 10% dinitrotoluene, by weight of propellant to be deterred, was applied by suspending the grains in water containing gum arabic as a protective colloid and the required amount of dinitrotoluene dissolved in a minimum amount of 80/20 methyl ethyl ketone/toluene. The suspended spheres were agitated for 30 minutes at a temperature of 75° C. The temperature of the suspension was raised to 80° C. and the solvent removed by distillation. After cooling, the spherical propellant grains were removed, washed and dried at 40° C. in a circulating air oven for five days. A glaze of 0.25% graphite was put on the spheres by means of a sweetie barrel.

*Example III*

Nitrocellulose containing 11% nitrogen was made up in a solution of diethylene glycol containing 8% by weight of nitrocellulose. (The nitrocellulose contained 2% diphenylamine as a stabilizer). To this saturated solution of nitrocellulose 11% nitrogen was added cores of nitrocellulose 13.5% nitrogen which had been made by extruding the nitrocellulose and cutting the strands to give particles which were .05 inch in diameter and .05 inch long. After thorough mixing the solution containing the core particles was allowed to pass through a series of holes of 0.09 inch diameter in the bottom of the vessel. The droplets thus formed, most of which contained cores of the nitrocellulose 13.5% nitrogen, were dropped into a water bath and were kept in motion for about 12 hours.

The propellant grains thus formed were then air dried at 75° F. for about 24 hours and glazed with graphite in a sweetie barrel. The average grain diameter was about .07 inch.

*Example IV*

A composition equivalent to a commercial nitrocellulose composition as given in Example V below was made up and extruded through a triangular-shaped die to give a strand the cross section of which was an isosceles triangle having a height of 0.04 inch. The strand was cut into 0.04 inch lengths and the geometrically shaped cores (prisms) were air dried at 80° F. for 24 hours. These grains were tumbled in a mixture of 60/40 nitrocellulose 12.6% nitrogen dinitrotoluene to give rounded grains having an average diameter of about .045 inch. The grains were glazed with graphite.

*Example V*

In order to double extrude a propellant grain strand, a preform core of a composition equivalent to a typical commercial nitrocellulose propellant was made up in the shape of a cylinder 1½ inches in diameter and 8 inches long. The core material was 93% nitrocellulose (13.15% nitrogen), 1% $K_2SO_4$, 5% dinitrotoluene and 1% diphenylamine and was made by kneading these components in sufficient acetone to make the mixture extrudable. While still in a readily pliable state the end which was to go first into the convergent section of the cylinder was formed by means of a press so that it was preshaped for extruding. The truncated cone thus formed was about 2¼ inches long, was ⅛ inches in diameter and had an angle of inclination of 73.5°. The outside preform was extruded of nitrocellulose 11% nitrogen using alcohol as a vehicle, into a cylinder having an outside diameter of 2¼ inches and an inside diameter of 1¹⁷⁄₃₂ inches. This cylinder of nitrocellulose was preshaped into a mold for extruding. The final thickness of the wall at the top of the cone was ¹⁄₃₂ inch and inside diameter was ⅛ inch. The core was slipped into the nitrocellulose preform and the resulting double stick was inserted into an extrusion press designed to use preforms of the above dimensions (FIG. 5). A die of 0.70 inch diameter was used. The resulting propellant strand was passed through a cutter and grains 0.15 inch long were cut. The grains after being air dried were about 0.60 inch in diameter and 0.12 inch long. They were graphite glazed in a sweetie barrel. Microscopic examination of a grain cross section showed that a nitrocellulose core of about 0.4 inch in diameter and outside layer of about 0.1 inch thick had been formed. The presence of the two layers was easily discernible.

*Example VI*

A nitrocellulose commercial propellant was prepared as described in Example V. Using this material as core material and nitrocellulose (11% nitrogen) as outside layer material, multiple layer propellant strands were extruded in equipment designed as shown in FIGS. 6 and 7. The resulting strands were cut before drying to form "pillow" type grains as shown in FIG. 2 (c). After grains were air dried at 80° F. for 24 hours, they were deterred with 5% dinitrotoluene and then glazed with graphite in a sweetie barrel.

*Example VII*

Strands of a mixture of 80% cyclotrimethylenetrinitramine and 20% polyisobutylene by weight were made by extruding this mixture made to a putty like consistency with carbon tetrachloride. After drying, the strands had a diameter of 0.02 inch. These core strands were then passed, by way of rollers and a guide plate into an extruder similar to that illustrated in FIG. 8. Nitrocellulose, containing 11% nitrogen and made up to an extrudable consistency with alcohol, was used as the outside layer material. The die used had a diameter of 0.06 inch and the grains when dried had average outside diameters of 0.05 inch. The strands were cut with a rotary cutter as they emerged from the extruder and the resulting grains with average lengths of 0.10 inch, had distinctly defined cores and outside layers as illustrated in FIG. 2(b).

*Example VIII*

An 0.046 inch diameter strand of the nitrocellulose composition described in Example V was coated with an outside layer of slow-burning nitrocellulose (11% nitrogen) in equipment similar to that illustrated in FIG. 9. A coating guide was prepared by soldering a ½ inch brass stand to the bottom of a brass cup. An 0.046 inch hole was drilled vertically through the cup and stand and the hole in the cup enlarged to 0.093 inch. A solution containing 2.9% nitrocellulose (12.6% nitrogen) and 7.5% nitrocellulose (11% nitrogen) was prepared in diethylene glycol and placed in the brass cup. The previously prepared nitrocellulose strand was fed through the 0.046-inch diameter guide hole in the strand into the cup containing the solution and then through the center of the 0.093-inch hole. The strand coated with the nitrocellulose solution was conducted out of the bottom of the brass cup into a water bath. The strand was water leached (shock gelled) for 12 hours, cut into grain lengths, and air dried at 80° F. The grains were glazed with graphite in a sweetie barrel to give a free-flowing propellant.

*Example IX*

A double chambered extruder head was assembled as shown in FIG. 10 with one chamber concentric with the other. The die of the extruder head connected with the outer chamber was 0.125 inch in diameter. The core chamber was connected to an 0.048 inch diameter tube position in the center of the 0.125 inch die. A solution containing 5.8% nitrocellulose (12.5% nitrogen) was dissolved in diethylene glycol and placed in the core chambers. A solution containing 2.7% nitrocellulose (12.6% nitrogen) and 7.5% nitrocellulose (11% nitrogen) was dissolved in diethylene glycol and placed in the outer chamber. By the proper variation of pressure on the two chambers a continuous strand of nitrocelluose with a distinctive core and outer layer was extruded into a water bath. The strand was water leached (shock gelled) for 12 hours, cut into grain lengths and air dried. The grains, having an outside diameter averaging 0.05 inch, consisted of a slow-burning outside layer and a fast-burning core.

We claim:

1. A process for forming propellant grains each containing a core and at least one discrete outside layer, which comprises forming a lacquer of the outside layer material and a solvent therefor, adding the core material to the lacquer formed, dispersing the lacquer-core mixture in a non-solvent medium and stirring until desirable lacquer-coated grains are formed, driving off said solvent used in forming said lacquer, separating said grains from said non-solvent medium, and drying said grains, said core material being present in small discrete particles and having burning characteristics different from said outside layer material, said outside layer material being capable of sustaining combustion without external oxygen, said solvent being one which is a solvent for the polymeric material and a non-solvent for the core material, and said non-solvent medium being a liquid which is a non-solvent for said core material and said lacquer.

2. A process for forming propellant grains each containing a core and at least one discrete outside layer, which comprises forming a gel of the outside layer material and a solvent therefor, mixing the core material in said gel, adding the core-containing gel to a non-solvent medium to form a slurry, mixing into the slurry a solvent for the outside layer material to form a lacquer with said outside layer material, agitating the resulting dispersion until lacquer-coated core globules are formed and subsequently shaped into propellant grains, driving off said solvent used in forming said lacquer, separating said grains from said non-solvent medium and drying said grains, said core material being present in small discrete particles and having burning characteristics different from said outside layer material, said outside layer material being capable of sustaining combustion without external oxygen, said solvent being a solvent for said outside layer material and a non-solvent for said core material and said non-solvent medium being a liquid which is a non-solvent for said core material and said lacquer.

3. A process for forming propellant grains each containing a core and at least one discrete outside layer, which comprises forming a slurry of the outside layer material in a non-solvent medium, agitating said slurry and adding the core material, stirring in a solvent for said outside layer material to form a lacquer with said outside layer material, agitating the resulting dispersion until the cores become coated with said lacquer to form propellant grains, driving off said solvent used in forming said lacquer, separating said grains from said non-solvent medium, and drying said grains, said core material being present in small discrete particles and having burning characteristics different from said outside layer material, said outside layer material being capable of sustaining combustion without external oxygen, said solvent being a solvent for the outside layer material and a non-solvent for said core material and said non-solvent medium being a liquid which is a non-solvent for said core material and said lacquer.

References Cited by the Examiner

UNITED STATES PATENTS

| | | | |
|---|---|---|---|
| 2,027,114 | 1/36 | Olsen et al. | 264—3 X |
| 2,329,575 | 9/43 | Allison et al. | 264—3 X |
| 2,339,114 | 1/44 | Scherer | 264—4 |
| 2,590,060 | 3/52 | Zenftman et al. | 264—3 |
| 2,687,553 | 8/54 | Colombo | 264—3 |
| 2,766,478 | 10/56 | Raley et al. | 264—4 |
| 2,799,897 | 7/57 | Jansen | 264—4 |
| 3,014,246 | 12/61 | Cook et al. | 264/3 |
| 3,037,247 | 6/62 | Preckel | 264—3 |

CARL D. QUARFORTH, *Primary Examiner.*